United States Patent
Rucker

(10) Patent No.: US 6,836,998 B1
(45) Date of Patent: Jan. 4, 2005

(54) PNEUMATIC BAIT BUCKET

(76) Inventor: Shane A. Rucker, 5182 3rd Ave., Pittsville, WI (US) 54466

( * ) Notice: Subject to any disclaimer, the term of this patent is extended or adjusted under 35 U.S.C. 154(b) by 0 days.

(21) Appl. No.: 10/455,980

(22) Filed: Jun. 9, 2003

(51) Int. Cl.$^7$ ............................................. A01K 97/05
(52) U.S. Cl. ........................................................... 43/57
(58) Field of Search ............................................. 43/57

(56) References Cited

U.S. PATENT DOCUMENTS

| | | | |
|---|---|---|---|
| 3,509,657 A | * 5/1970 | Bross, Jr. ......................... | 43/57 |
| 3,972,145 A | * 8/1976 | Key ................................ | 43/57 |
| 4,162,681 A | 7/1979 | Patterson | |
| 4,686,788 A | 8/1987 | Hartman | |
| 4,864,769 A | 9/1989 | Sandahl | |
| 4,970,982 A | 11/1990 | Martin | |
| 5,172,511 A | * 12/1992 | Smith et al. .................... | 43/56 |
| 5,193,301 A | 3/1993 | Figgins | |
| 5,799,435 A | * 9/1998 | Stafford ......................... | 43/57 |
| 5,822,916 A | 10/1998 | Power | |
| 6,101,759 A | * 8/2000 | Power ............................ | 43/55 |

* cited by examiner

Primary Examiner—Michael J. Carone
Assistant Examiner—Bret Hayes

(57) ABSTRACT

The apparatus includes outer and inner walls that define an first container and an second container in fluid communication with each other. The second container includes an aperture formed therein with an elongate hose passing through the aperture for cooperating with a pump that selectively exhausts and compresses air into the apparatus to thereby cause water to pass through the inner and outer cavities via the hose. Advantageously, when air is introduced into the first container, water is introduced into the second container and, when air is removed from the first container, water is removed out of the second container to thereby make it easier for a user to remove live bait from the second container. A seine may be positioned within the second container for assisting to disburse air bubbles around a perimeter thereof. In addition, the water inside the apparatus can be aerated when air is introduced into first container while the lid is at an open position.

20 Claims, 6 Drawing Sheets

PNEUMATIC BAIT BUCKET

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a bait bucket and, more particularly, to a pneumatic bait bucket including an air pump for selectively controlling the water level inside the bucket so that live bait can be easily removed.

2. Prior Art

Bait buckets for carrying live bait are well known in the art. Pails have been used for years to hold a quantity of water containing minnows, leeches and the like, which must be kept in water in order to preserve their greatest usefulness as bait. When live bait is free in the water, however, it can be quite difficult to catch the bait because it can elude one's reach. In addition, it is generally necessary to put at least a hand, and probably a forearm, into the water in order to capture the live bait. This means that one may need to take time to roll up a sleeve so that it does not get wet. Furthermore, because one's hand and forearm generally do get wet when the bait is retrieved from the bucket, one may feel a need to dry off after retrieving bait from the bucket, especially in cold and windy weather.

In order to provide a bait bucket which does not require the user to capture live bait while the bait is swimming in water, a number of bait buckets have been proposed. Such prior art bait buckets may include an outer housing and an inner housing having water passage means for allowing water to pass into and out of the interior of the inner housing. Thus, the inner housing can be removed from the outer housing leaving the water behind but retaining the live bait so that the bait may be easily selected without putting one's hand and forearm into the water.

Unfortunately, it generally takes two hands to manipulate bait buckets of this kind in order to retrieve one's bait. The inner housing must be lifted or otherwise manipulated with one hand, while the bait is retrieved with the other hand. If the angler has a fishing rod to hold with one hand, it generally needs to be put down in order to select the bait.

Accordingly, a need exists for a bait bucket which can be easily manipulated with a single hand in order to select and remove live bait without putting one's forearm into the water in an attempt to capture the bait. The present invention provides a solution to this and other problems and offers other advantages over the prior art, and solves other problems associated therewith.

BRIEF SUMMARY OF THE INVENTION

In view of the foregoing background, it is therefore an object of the present invention to provide a pneumatic bait bucket including a water level adjusting means that is easily operable by a user. These and other objects, features, and advantages of the invention are provided by an apparatus for storing bait. The apparatus includes a first container defining an outer wall and a second container defining an inner wall and being removably positionable within the first container. The second container has a plurality of apertures formed in the inner wall thereof for allowing the first and second containers to be in fluid communication with each other.

A lid is attached to the top portion of the apparatus and is selectively movable between open and closed positions. The apparatus is generally airtight after the lid is moved to a closed position. The lid preferably includes a latch for assisting to maintain the lid at a closed position. The apparatus further includes a mechanism for selectively exhausting and compressing air into the apparatus for causing water to pass through the first and second containers. Advantageously, when air is introduced into the first container water is introduced into the second container and when air is removed from the first container water is removed out of the second container to thereby make it easier for a user to remove live bait therefrom. In addition, the water inside of the second container becomes aerated when air is introduced into the first container and when the lid is at an open position.

The apparatus further includes a control panel attached to the outer wall of the first container for selectively operating the mechanism for exhausting and compressing air. The control panel may include a power supply source such as a battery, for example. The apparatus may further include a power supply cord removably attachable to the power supply source for recharging same when the apparatus is not in an operating mode and for supplying power to the apparatus when same is in an operating mode.

The mechanism for selectively exhausting and compressing air preferably includes an air pump disposed generally within the control panel and operatively connected to the first container. An elongate hose passes through the plurality of apertures and has opposed end portions disposed within the first and second containers respectively for selectively transferring water therebetween. A plurality of seals are preferably fitted within the plurality of apertures and around the hose for assisting to maintain the second container substantially air-tight from the first container.

The apparatus may further include a seine having a substantially annular shape and a plurality of apertures formed adjacent to a perimeter thereof. The seine is preferably disposed adjacent to the bottom of the second container and for causing an air pocket to form at a center portion thereof. Advantageously, air bubbles can be evenly disbursed through the plurality of apertures when the apparatus is placed on an uneven surface.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout, and prime and double prime notations are used to indicate similar elements in alternate embodiments.

Figure 1:
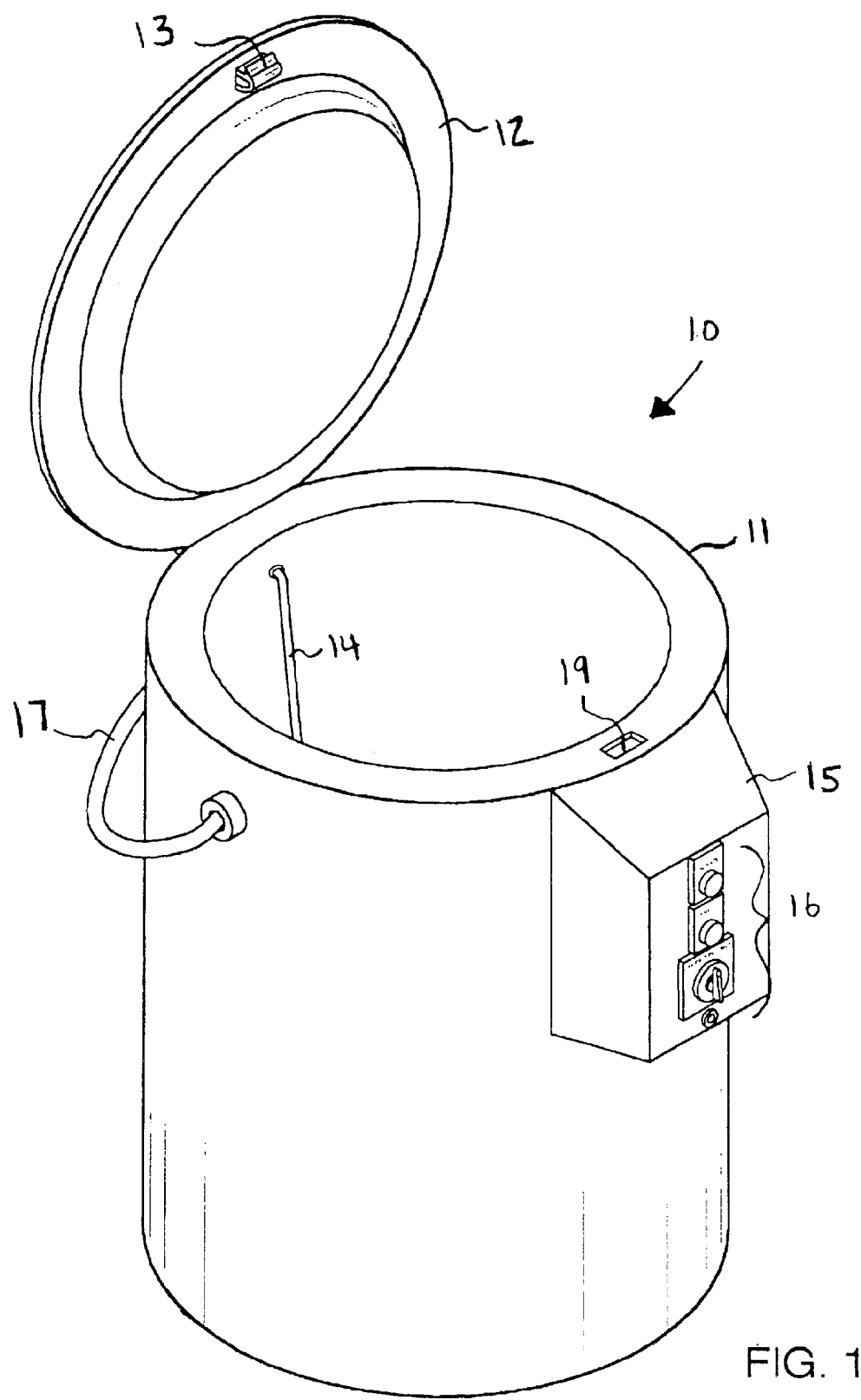
FIG. 1 is a perspective view showing a pneumatic bait bucket, in accordance with the present invention.

The apparatus or bait bucket of this invention is referred to generally in FIG. 1 by the reference numeral 10 and is intended to store live bait and aerate water inside the bucket and to allow a user to more easily remove such live bait therefrom. It should be understood that the bait bucket 10 may be used to store many types of live bait in water and should not be limited to storing and aerating only leeches and minnows.

The bait bucket 10 includes a substantially cylindrical housing 11 and a lid 12 having a generally annular shape attached to a top portion of the housing 11 and selectively movable between open and closed positions. The housing 11 is defined as the first and second containers 24, 25, respectively. The lid 12 is pivotally connected to housing 11 by a fastener 18 as perhaps best shown in FIG. 2. A notch 19 is formed along a perimeter of the housing 11 and at a top portion thereof for receiving a releasable latch 13 extending downwardly from a bottom surface of lid 12. Such a latch 13 has a lip protruding outwardly therefrom and for engaging a sidewall of notch 19 when the lid 12 is moved to a close position, as perhaps best shown in FIG. 2. In particular, when lid 12 is at a closed position, the lower portion of latch 13 becomes disposed below notch 19 with its lip engaged therewith. Thus, lid 12 may be maintained at a closed position while latch 13 is locked with notch 19.

A handle 17 having opposed end portions secured to the exterior surface of housing 11. Such a handle 17 is pivotable between down and up positions for assisting a user to carry the apparatus 10. A control panel 15 is connected to an exterior surface of housing 11 and includes a plurality of control buttons 16 positioned at the exterior surface thereof for easy user access.

Figure 2:
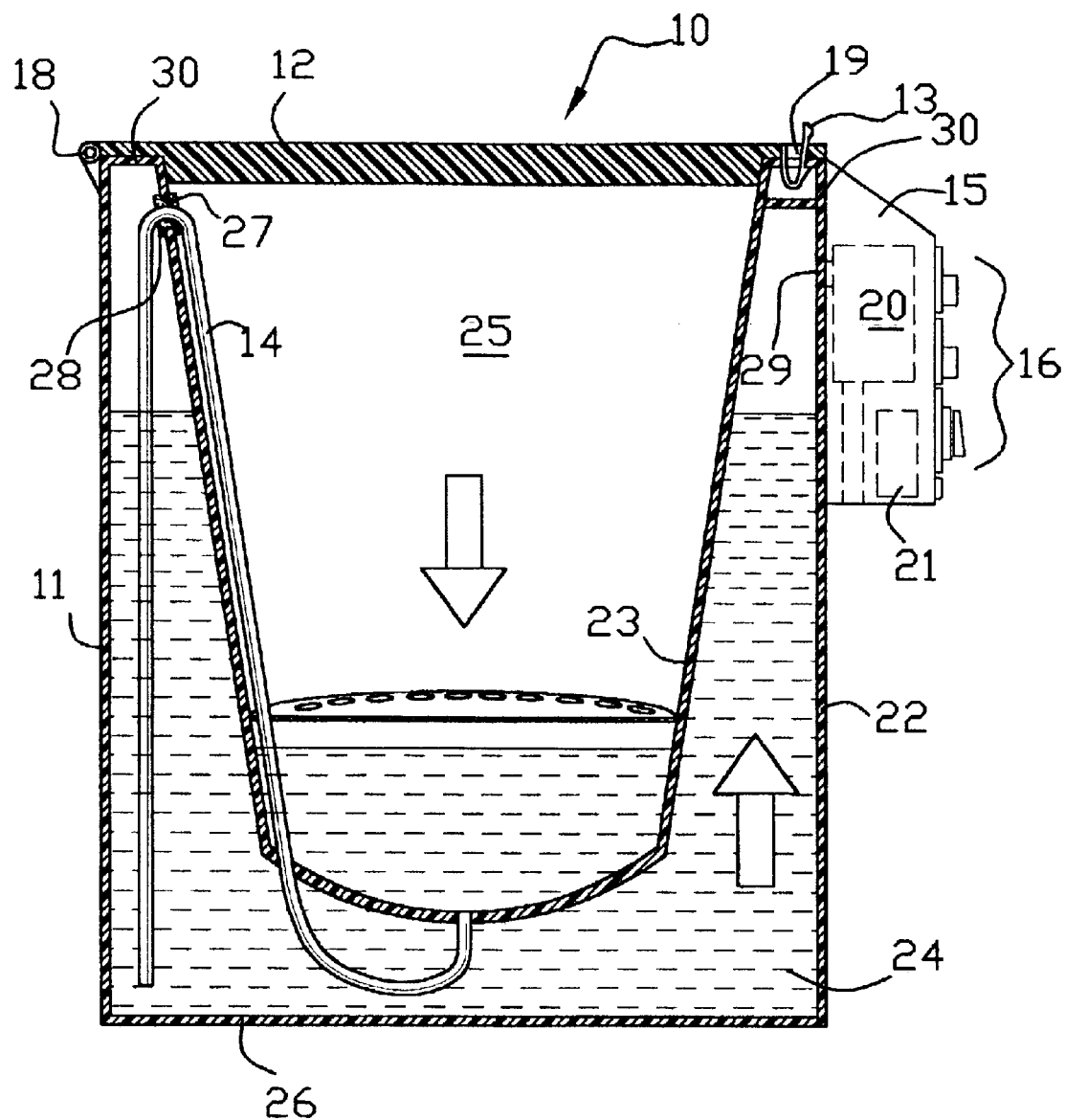
FIG. 2 is a cross-sectional view thereof and shows the corresponding water levels of the bait bucket after a predetermined amount of air has been exhausted from the first container of the bucket.

Now referring to FIG. 2 in more detail, control panel 15 houses a conventional air pump 20 and a conventional power supply source 21. Such an air pump 20 is powered by power supply source 21, which may include a set of conventional batteries readily available in the industry. Accordingly, when control buttons 16 are depressed, the air pump 20 becomes activated and either introduces/compresses air into a first container 24 or removes/exhausts air therefrom. In particular, an opening 29 is formed in the outer wall 22 of housing 11 for allowing the air pump 20 to transfer air therethrough.

The outer wall 22 forms the general shape of the cylindrical housing 11 and an inner wall 23 forms the general shape of the second container 25 disposed within housing 11. The first container 24 has a top portion 30, which is defined by the perimeter of housing 12. Notably, air can only be introduced into or removed from first container 24 via opening 29.

The second container 25 has a top portion defining a lip and engaging a corresponding lip of the first container 24. Its inner wall 23 converges downwardly towards a lower portion of housing 11. The bottom surface of the second container 25 has a generally convex shape and is spaced from the bottom surface 26 of housing 11 thereby allowing water to travel therebetween. A plurality of apertures 27 are formed in the inner wall 23 of the second container 25 and at upper and lower portions thereof. Such apertures 27 allow an elongate flexible hose 14 to pass therethrough with the opposed end portions of the hose 14 being disposed within second container 25 and first container 24, respectively.

Of course, such opposed end portions should be disposed below the respective water levels of the second container 25 and first container 24 so that the water levels can be adjusted as air in introduced and removed from the first container 24. A plurality of seals 28 are fitted within apertures 27 and around the outer surface of hose 14 so that a substantially airtight connection is formed between hose 14 and aperture 27.

A seine 35, having a substantially annular shape and a plurality of apertures formed adjacent to a perimeter thereof, is removably positionable within the second container 25. The seine is preferably disposed adjacent to a bottom of the second container for causing an air pocket to form at a center portion thereof so that air bubbles can be evenly disbursed through the plurality of apertures when the apparatus is being aerated while placed on an uneven surface.

FIG. 2 perhaps best illustrates the respective water levels within the first container 24 and the second container 25 after air pump 20 has removed a predetermined amount of air from first container 24. Thus, the water level of the first container 24 has been raised and the water level of the second container 25 has been lowered. Such respective water levels are desired when a user or angler is ready to remove live bait positioned within second container 25. By lowering the water level of the second container 25, live bait such as minnows and leeches are positioned in a more concentrated area and therefore become more easily removable from the second container 25.

Figure 3:
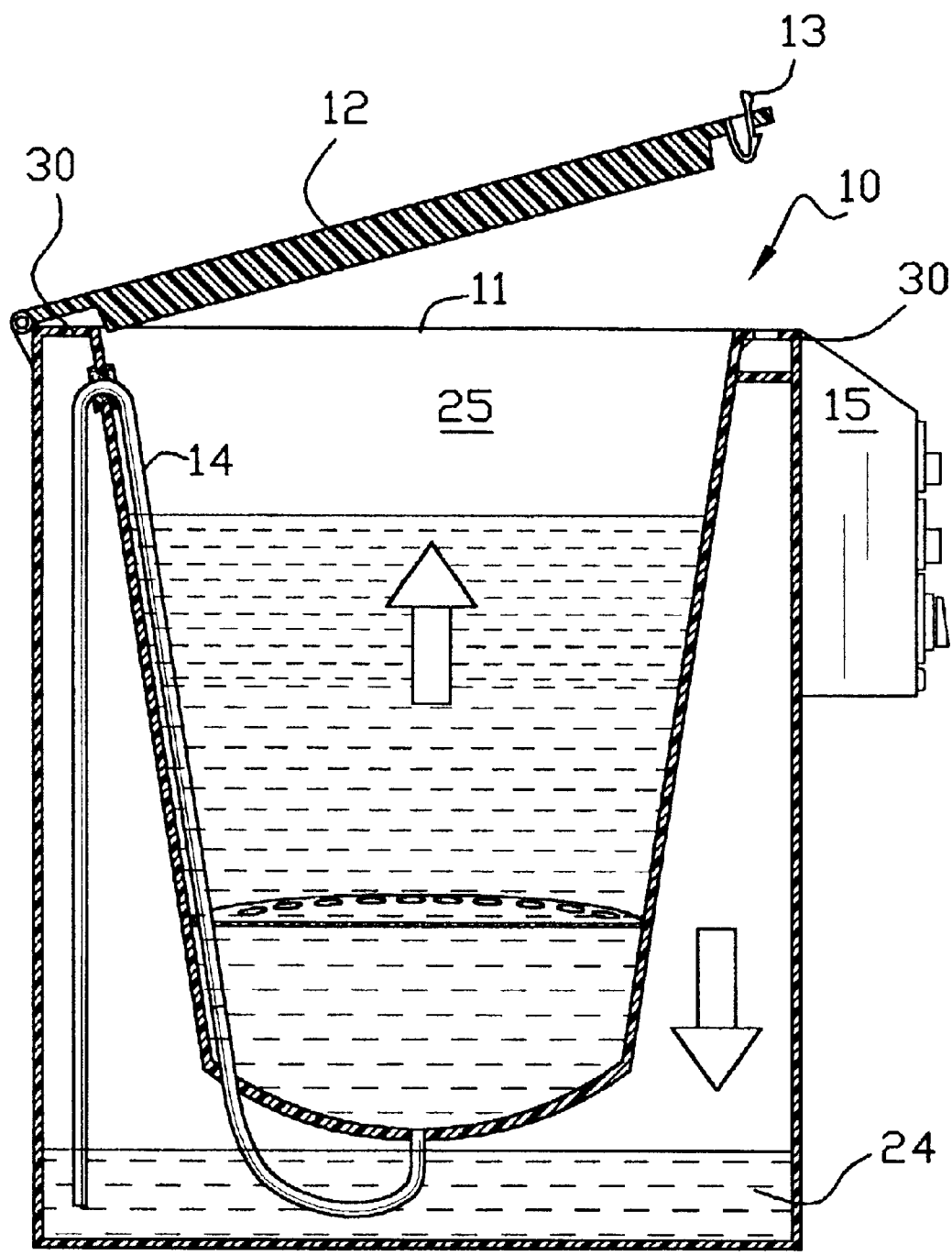
FIG. 3 is a cross-sectional view thereof and shows the corresponding water levels of the bait bucket after a predetermined amount of air has been compressed into the first container of the bucket.

Now referring to FIG. 3, the second container 25 is shown as having a higher water level with the first container 24 having a lower water level. In such a state, lid 12 has been moved to an open position thereby allowing air to freely flow into and out of the second container 25. More importantly, with lid 12 was at a closed position, the air pump 20 located within the control panel 15 introduced air into the first container 24 to thereby cause water to be transferred, via hose 14, into second container 25. With lid 12 moved to an open position, the live bait in the second container 25 may be aerated by introducing air into the first container 24. To aerate the water, the air pump 20 may be selectively operatively via a timer device 34 connected to the control panel 15. Therefore, a user may activate the air pump 20 over a predetermined time-span so that the water inside the second container 25 can be aerated.

Figure 4:
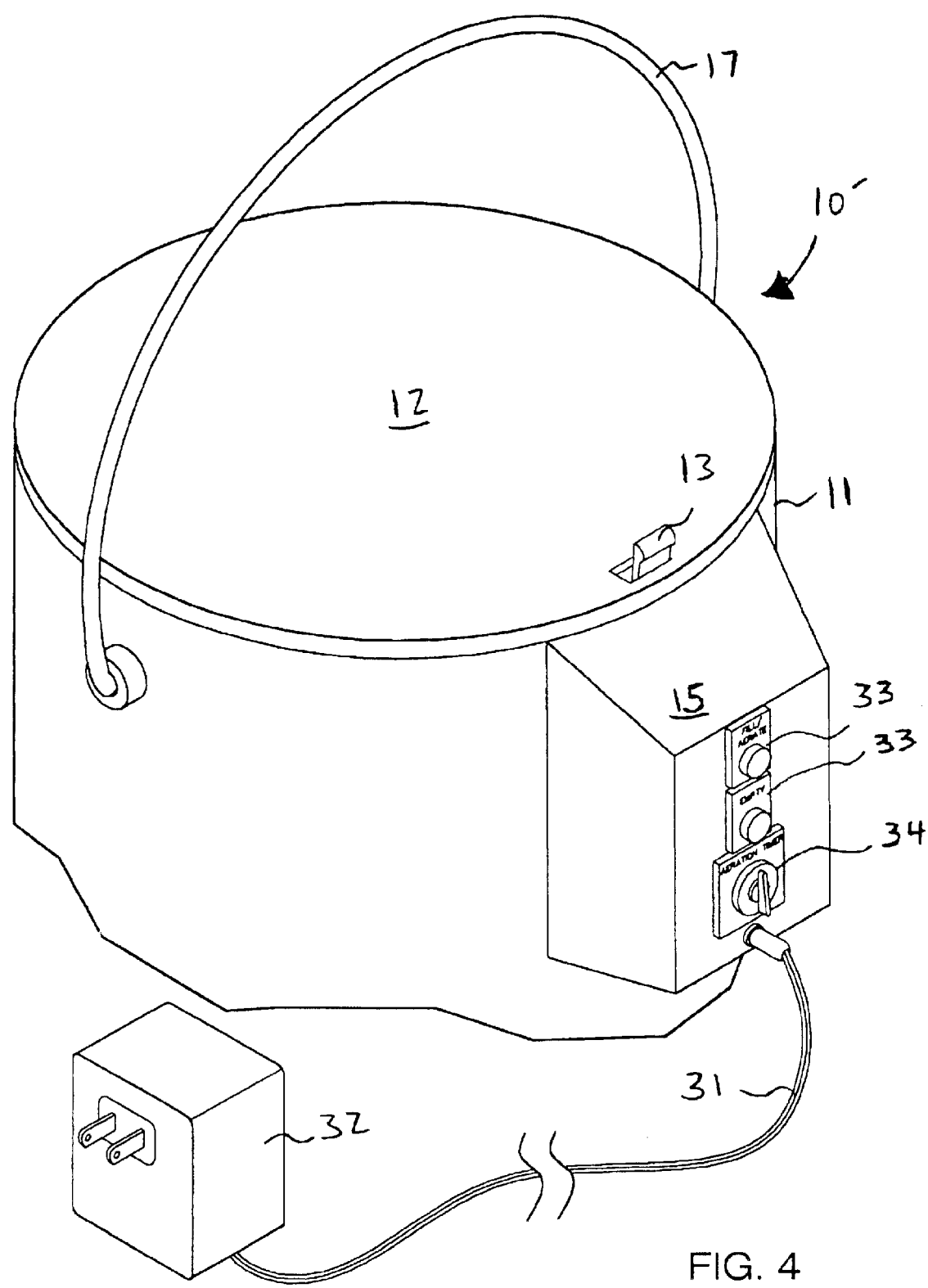
FIG. 4 is a partial perspective view of the bait bucket showing a power cord removably attached thereto.

Now referring to FIG. 4, an alternate embodiment 10' is shown as including a power cord 31 having opposed end portions connectable to a power outlet and control panel 15, respectively. A transformer 32 is also connected to power cord 31. In addition, the power supply source 20 may be recharged with power cord 31 when the apparatus 10' is not being operated. Otherwise, the apparatus 10' may be operated by a power cord 31 and not the power supply source 21 located within control panel 15.

Figure 5:
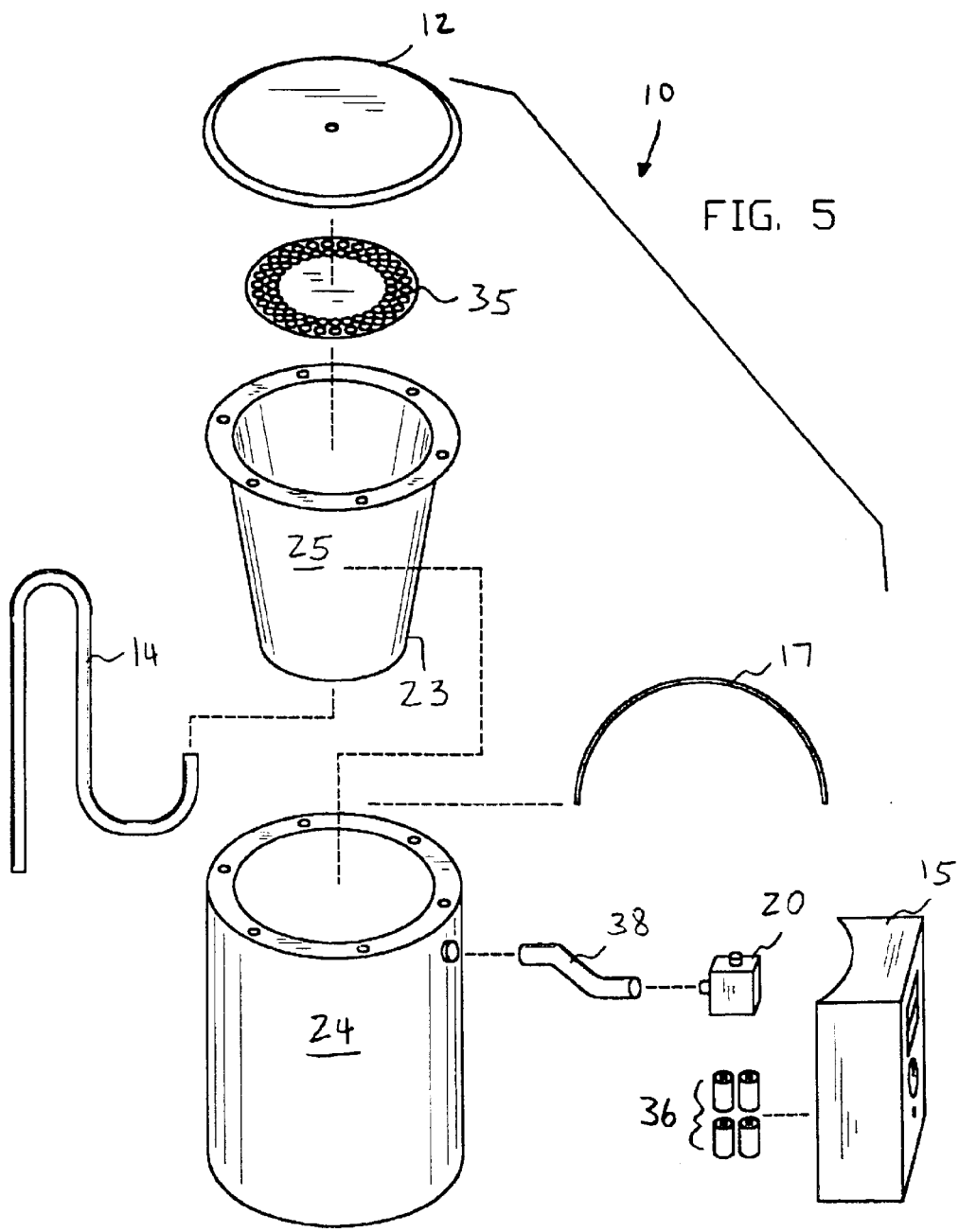
FIG. 5 is an exploded view of the bait bucket.

Now referring to FIG. 5, an exploded view of bait bucket 10 is shown wherein lid 12 is connectable to outer container 24. Inner container 25 is removably positionable within the outer container 24 and rests on a perimeter thereof. Inner container 25 has an inner wall 23 that converges downwardly to form a generally conical shape. Hose 14 is shown as being bendable in different directions with one end being positionable into a lower portion of the inner container 25. Such a lower portion preferably has a concave shape for assisting the water to be drained out of the bottom thereof.

A saucer-shaped member 35 or seine is disposed above such an end portion of the hose 14 for preventing live bait from being sucked into hose 14. Air pump 20 is connectable to the outer container 24 via hose 38 and is preferably powered by batteries 36. Such an air pump 20 and batteries 36 are preferably housed within the control panel 15 and selectively operable thereby.

Figure 6:
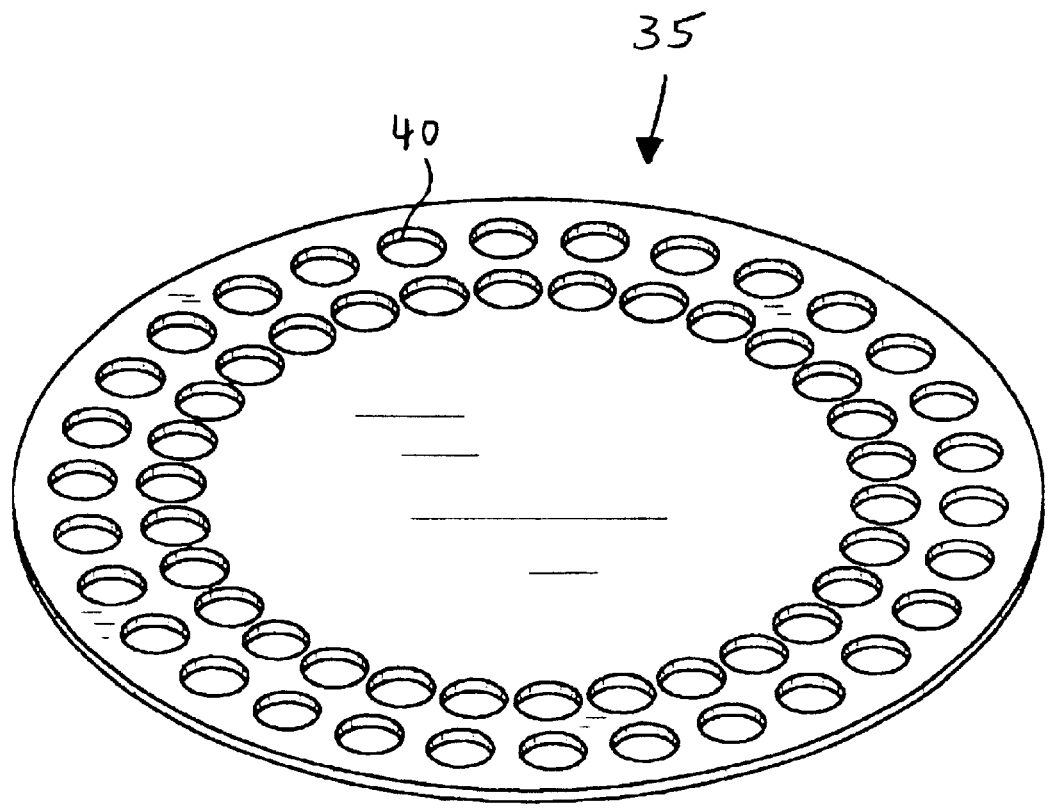
FIG. 6 is an enlarged perspective view of the seine shown in FIGS. 2 and 3.

As perhaps best shown in FIG. 6, seine 35 has a generally annular shape and includes a plurality of apertures 40 for allowing air bubbles to pass therethrough a aerate the water inside the inner container 25. The seine 35 will build an air pocket in the center thereof and will help the even disbursement of the air bubbles when the bait bucket is sitting on uneven ground. The seine 35 is used to allow the even flow of air bubbles to aerate the water towards the outer perimeter of the inner container 25. This can also assist to prevent the water in the bait bucket 10 from freezing during inclement weather conditions, such as when ice fishing.

Furthermore, the seine 35 helps to prevent the live bait from being sucked into the hose 14 and deposited into the holding container. Thus, the plurality of apertures 40 are preferably smaller than the live bait but sufficiently large for allowing water to flow therethrough and towards hose 14. The seine 35 therefore acts as an aeration device and also assists to effectively maintaining the live bait within the inner container 25 while draining the water therefrom.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus for storing bait and comprising:
   a first container defining an outer wall;
   a second container defining an inner wall and being removably positionable within the first container, said second container having a plurality of apertures formed in the inner wall thereof for allowing said first and second containers to be in fluid communication with each other, said apparatus having a top portion;
   a lid attached to the top portion of said apparatus and being selectively movable between open and closed positions, said apparatus being air-tight after said lid is moved to a closed position;
   means for selectively exhausting and compressing air into said apparatus for causing water to pass through the first and second containers so that when air is introduced into said first container water is introduced into said second container and when air is removed from said first container water is removed out of said second container to thereby make it easier for a user to remove live bait therefrom; and
   a control panel attached to the outer wall of said first container for selectively operating said means for exhausting and compressing air;
   said water being aerated when air is introduced into said first container and said lid is at an open position.

2. The apparatus of claim 1, wherein said means for selectively exhausting and compressing air comprises:
   an air pump disposed within said control panel and operatively connected to the first container; and
   an elongate hose passing through said plurality of apertures and having opposed end portions disposed within said first and second containers respectively for selectively transferring water therebetween.

3. The apparatus of claim 2, further comprising a plurality of seals fitted within said plurality of apertures and around said hose for assisting to maintain said second container air-tight from said first container.

4. The apparatus of claim 1, wherein said control panel comprises a power supply source.

5. The apparatus of claim 4, wherein said power supply source comprises a battery.

6. The apparatus of claim 1, wherein said lid comprises a latch for assisting to maintain said lid at a closed position.

7. The apparatus of claim 1, further comprising a seine having a plurality of apertures formed adjacent to a perimeter thereof and for causing air bubbles to be evenly disbursed through said seine's plurality of apertures when said apparatus is placed on an uneven surface, said seine being disposed at a bottom portion of said second container.

8. The apparatus of claim 4, further comprising a power supply cord removably attachable to said power supply source for recharging same when the apparatus is not in the operating mode and for supplying power to said apparatus when same is in the operating mode.

9. An apparatus for storing bait and comprising:
   a first container defining an outer wall;
   a second container defining an inner wall and being removably positionable within the first container, the inner wall converging downwardly for defining a generally conical shape, said second container having a plurality of apertures formed in the inner wall thereof for allowing said first and second containers to be in fluid communication with each other, said apparatus having a top portion;
   a lid attached to the top portion of said apparatus and being selectively movable between open and closed positions, said apparatus being air-tight after said lid is moved to a closed position;
   means for selectively exhausting and compressing air into said apparatus for causing water to pass through the first and second containers so that when air is introduced into said first container water is introduced into said second container and when air is removed from said first container water is removed out of said second container to thereby make it easier for a user to remove live bait therefrom; and
   a control panel attached to the outer wall of said first container for selectively operating said means for exhausting and compressing air;
   said water being aerated when air is introduced into said first container and said lid is at an open position.

10. The apparatus of claim 9, wherein said means for selectively exhausting and compressing air comprises:

an air pump disposed within said control panel and operatively connected to the first container; and an elongate hose passing through said plurality of apertures and having opposed end portions disposed within said first and second containers respectively for selectively transferring water therebetween.

11. The apparatus of claim 10, further comprising a plurality of seals fitted within said plurality of apertures and around said hose for assisting to maintain said second container air-tight from said first container.

12. The apparatus of claim 9, wherein said control panel comprises a power supply source.

13. The apparatus of claim 12, wherein said power supply source comprises a battery.

14. The apparatus of claim 9, wherein said lid comprises a latch for assisting to maintain said lid at a closed position.

15. The apparatus of claim 9, further comprising a seine having a plurality of apertures formed adjacent to a perimeter thereof and for causing air bubbles to be evenly disbursed through said seine's plurality of apertures when said apparatus is placed on an uneven surface, said seine being disposed at a bottom portion of said second container.

16. The apparatus of claim 12, further comprising a power supply cord removably attachable to said power supply source for recharging same when the apparatus is not in the operating mode and for supplying power to said apparatus when same is in the operating mode.

17. An apparatus for storing bait and comprising:

a first container defining an outer wall;

a second container defining an inner wall and being removably positionable within the first container, said second container having a plurality of apertures formed in the inner wall thereof for allowing said first and second containers to be in fluid communication with each other, said apparatus having a top portion;

a lid attached to the top portion of said apparatus and being selectively movable between open and closed positions, said apparatus being air-tight after said lid is moved to a closed position;

means for selectively exhausting and compressing air into said apparatus for causing water to pass through the first and second containers so that when air is introduced into said first container water is introduced into said second container and when air is removed from said first container water is removed out of said second container to thereby make it easier for a user to remove live bait therefrom;

a control panel attached to the outer wall of said first container for selectively operating said means for exhausting and compressing air; and a seine having a plurality of apertures formed adjacent to a perimeter thereof and for causing air bubbles to be evenly disbursed through said plurality of apertures when said apparatus is placed on an uneven surface, said seine being disposed at a bottom portion of said second container;

said water being aerated when air is introduced into said first container and said lid is at an open position.

18. The apparatus of claim 17, wherein said means for selectively exhausting and compressing air comprises:

an air pump disposed within said control panel and operatively connected to the first container; and an elongate hose passing through said plurality of apertures and having opposed end portions disposed within said first and second containers respectively for selectively transferring water therebetween.

19. The apparatus of claim 17, further comprising a plurality of seals fitted within said plurality of apertures and around said hose for assisting to maintain said second container air-tight from said first container.

20. The apparatus of claim 17, wherein said lid comprises a latch for assisting to maintain said lid at a closed position.

* * * * *